(12) United States Patent
Harper et al.

(10) Patent No.: US 7,538,980 B2
(45) Date of Patent: May 26, 2009

(54) ACTUATOR ASSEMBLY

(75) Inventors: David Harper, San Jose, CA (US);
Wayne I. Imaino, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 645 days.

(21) Appl. No.: 11/227,350

(22) Filed: Sep. 14, 2005

(65) Prior Publication Data

US 2007/0058298 A1    Mar. 15, 2007

(51) Int. Cl.
    *G11B 5/55*    (2006.01)
(52) U.S. Cl. .................................. 360/261.1
(58) Field of Classification Search ........... None
    See application file for complete search history.

(56) References Cited

U.S. PATENT DOCUMENTS

| | | | | |
|---|---|---|---|---|
| 4,631,430 A | | 12/1986 | Aubrecht | 310/12 |
| 4,669,013 A | | 5/1987 | Scranton et al. | 360/106 |
| 4,831,291 A | | 5/1989 | Ames | 310/13 |
| 5,371,636 A | * | 12/1994 | Nayak et al. | 360/75 |
| 5,434,549 A | | 7/1995 | Hirabayashi et al. | 335/229 |
| 5,731,935 A | * | 3/1998 | Lian et al. | 360/291 |
| 5,901,008 A | * | 5/1999 | Nayak et al. | 360/78.02 |
| 6,147,422 A | | 11/2000 | Delson et al. | 310/14 |
| 6,188,535 B1 | * | 2/2001 | Lemke et al. | 360/70 |
| 6,194,796 B1 | * | 2/2001 | Yeakley | 310/14 |
| 6,501,357 B2 | | 12/2002 | Petro | 335/229 |
| 6,741,151 B1 | | 5/2004 | Livshitz et al. | 335/222 |
| 6,847,726 B2 | | 1/2005 | Button et al. | 381/401 |
| 6,867,511 B2 | | 3/2005 | Fukunaga et al. | 310/12 |
| 2004/0100344 A1 | | 5/2004 | Livshitz et al. | 335/220 |
| 2004/0220565 A1 | | 11/2004 | Bales et al. | 606/47 |
| 2005/0031154 A1 | | 2/2005 | Stiles | 381/421 |
| 2005/0111140 A1 | | 5/2005 | Lee et al. | 360/264.7 |

FOREIGN PATENT DOCUMENTS

WO    WO 2004/040742    5/2004

* cited by examiner

*Primary Examiner*—Mark Blouin
(74) *Attorney, Agent, or Firm*—Zilka-Kotab, PC

(57) ABSTRACT

An actuator assembly according to one embodiment includes an inner effective annular magnet polarized radially, an outer effective annular magnet polarized radially, and a coil positioned between the inner and outer magnet structures. The magnet structures may be continuous magnets or constructed of multiple magnets. The coil may be a dual wound monofilament coil, where sections of the filament are wound in opposite directions.

18 Claims, 8 Drawing Sheets

ACTUATOR ASSEMBLY

FIELD OF THE INVENTION

The present invention relates to actuators, and more particularly, this invention relates to an actuator assembly implementing annular magnet structures.

BACKGROUND OF THE INVENTION

Tape drives typically utilize an actuator mechanism to position the read/write head over the appropriate tracks while the tape is moving. Current read-write head positioning devices used in magnetic tape drives often incorporate a dual stage actuator design. One actuator provides coarse positioning to move the read-write head between data bands. The other actuator provides fine positioning to maintain alignment between the read-write head and the data tracks. In use, the coarse positioning actuator first moves the read/write head to the general vicinity on the tape and then the fine positioning actuator is used for track following while the tape is in motion. The two actuators are usually mounted in a "piggyback" arrangement with the fine position actuator riding on the coarse position actuator.

The coarse positioning actuator is typically a linear stage driven by a stepper motor. Stepper motors have the ability to move the linear stage anywhere across the width of the magnetic tape at modest speeds. However, most stepper motors lack the accuracy and bandwidth necessary to maintain alignment between the read-write head and the data tracks as the magnetic tape moves across the face of the read-write head.

The fine positioning actuator is typically a voice coil motor (VCM) mounted on the linear stage and held at a rest position by some type of spring. A VCM actuator provides micron to submicron precision positioning at a bandwidth of hundreds to thousands of hertz. However, a single voice coil and spring combination that can meet the fine positioning requirements across the full width of the tape is expensive and unnecessary. Accordingly, virtually all current tape drives use some combination of a coarse positioning actuator and a fine positioning actuator.

In typical actuator designs for tape drives, the fine VCM actuator most often utilizes a housing that must minimize the magnetic flux leakage in order to protect the read/write head from exposure to the stray bias field. This typically means that the housing must physically encapsulate the magnet and pole piece subassembly in order to achieve a minimum flux leakage. Having a housing that physically surrounds the magnet means that the hardware to connect the head to the coil must pass through the housing, often times resulting in a multiple part subassembly of the actuator system.

What is needed is a magnet configuration that minimizes the amount of pole piece material needed for the flux path, thus eliminating the need for the entire magnetic housing to control the flux path and flux leakage. What is also needed is a coil structure that takes full advantage of such a magnet configuration.

SUMMARY OF THE INVENTION

This unique proposal describes a magnet configuration that minimizes the amount of pole piece material needed for the flux path, thus reducing or eliminating the need for the entire magnetic housing to control the flux path and flux leakage. One advantage of this design is a simplified magnetic path that can lead to a less costly magnetic housing as well as a simplified subassembly connecting the coil to the read/write head.

Accordingly, an actuator assembly according to one embodiment includes an inner annular magnet structure polarized radially, an outer annular magnet structure polarized radially, and a coil positioned between the inner and outer magnet structures. A flux field formed between upper portions of the magnet structures is oriented in an opposite direction as a flux field formed between lower portions of the magnet structures.

The coil may be a single wound coil, two coil structures coupled together, or preferably, a monofilament coil having a first section and a second section where the filament in the first section is wound in a first direction and the filament in the second section is wound in a second direction different than the first direction. A gap may be formed between the first and second sections of the coil.

The actuator assemblies described herein are useful for tape drive systems, and may further include a coarse positioning actuator coupled to the housing.

A tape drive system includes a head, a drive mechanism for passing a magnetic recording tape over the head, an actuator assembly as recited above coupled to the head, and a controller in communication with the actuator assembly.

Methods for using such assemblies and systems are also presented.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

Figure 1:
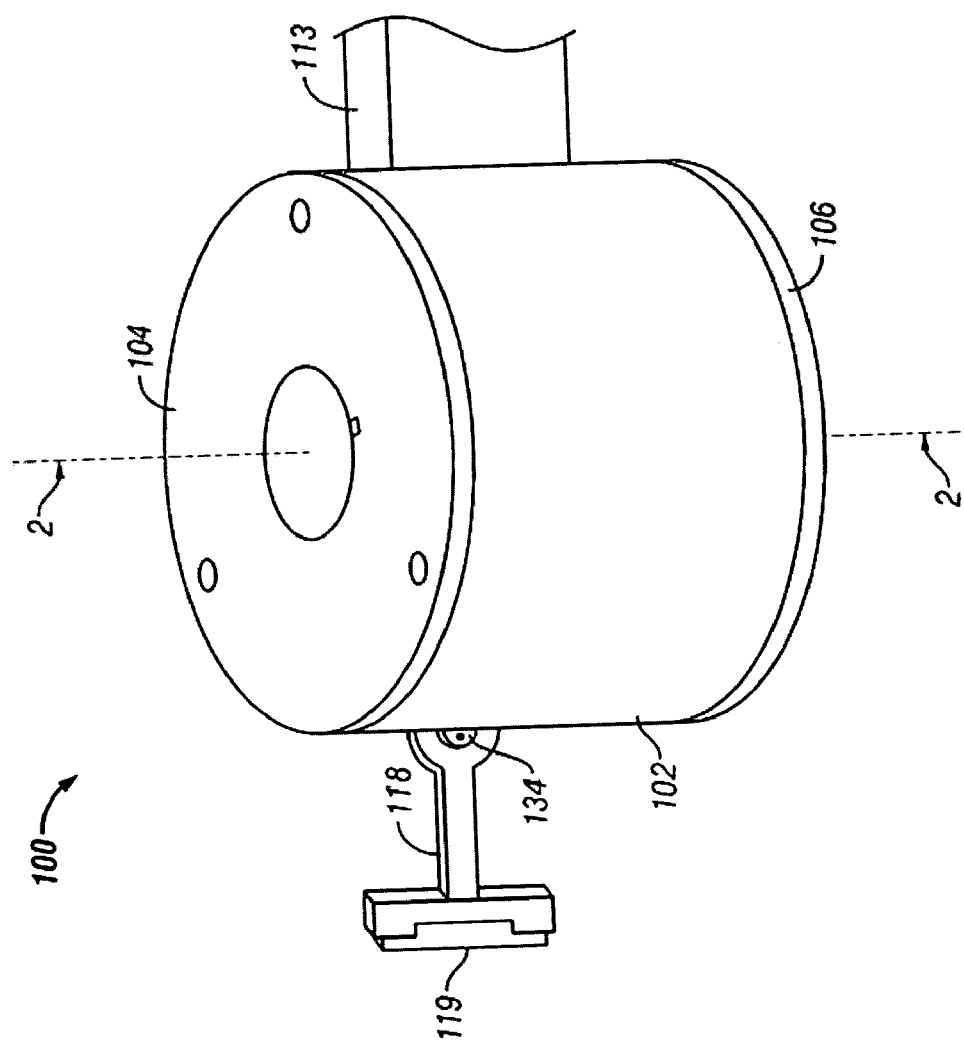
FIG. 1 is a perspective view of an actuator assembly according to one embodiment.

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

In the drawings, like and equivalent elements are numbered the same throughout the various figures.

The embodiments described herein disclose a magnet configuration for a magnetic actuator that minimizes the amount of pole piece material needed for the flux path, thus reducing or eliminating the need for the entire magnetic housing to control the flux path and flux leakage. One advantage of this design is a simplified magnetic path that can lead to a less costly magnetic housing as well as a simplified subassembly connecting the coil to the read/write head. Optionally, one could divide the magnets into wedge sections to create the same effect around the circumference of the inner and outer pole piece. To take full advantage of the magnet configuration, a dual wound monofilament coil may be used.

To aid the reader and to place the actuator in a context, the following description shall be described in terms of an actuator for positioning a tape head with respect to a tape passing over the tape head. However, while the actuator has particular applicability to tape drive systems, the actuator can be implemented in any system where actuation is needed.

Figure 2:
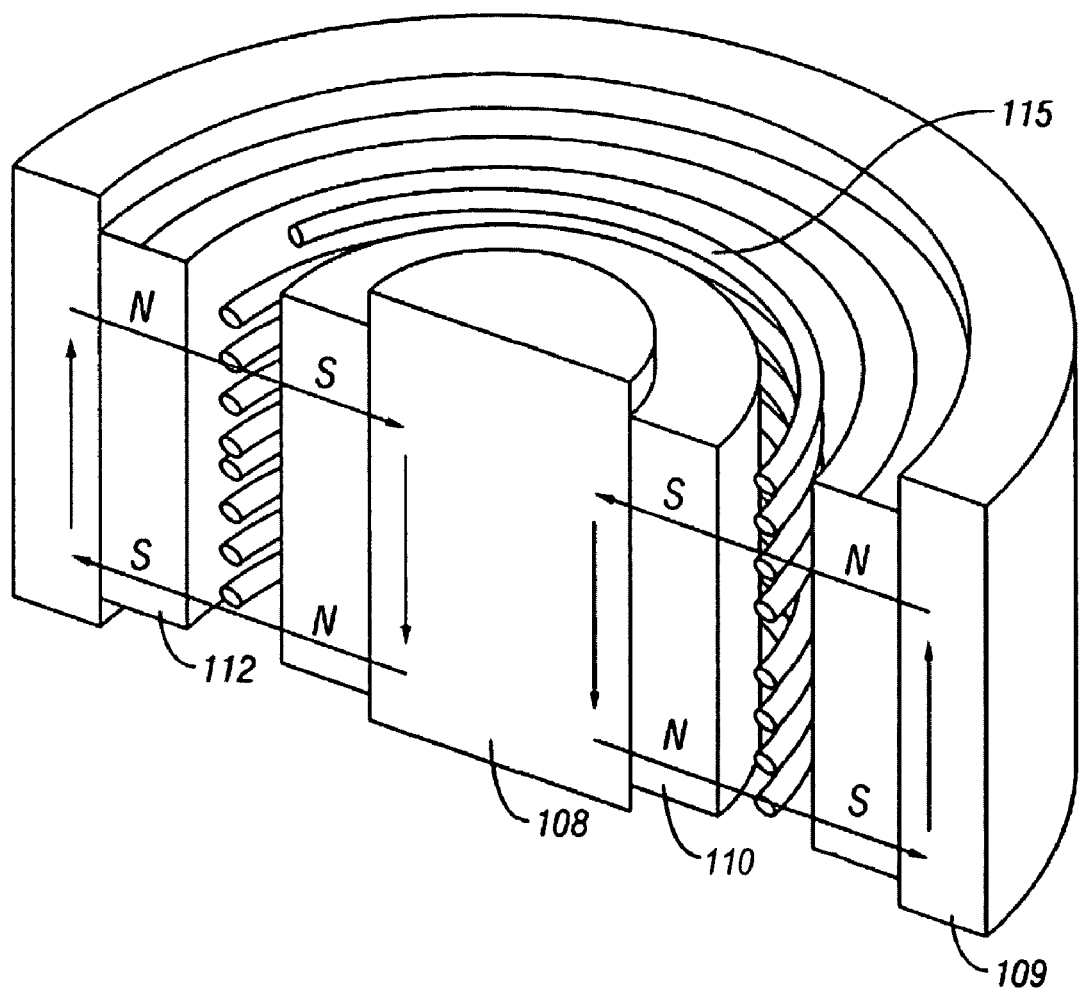
FIG. 2 is a partial sectional view of the actuator assembly taken along Line 2-2 of FIG. 1 where the magnet structures are continuous structures.

FIGS. 1 and 2 illustrate an actuator assembly 100 incorporating the magnet configuration of the present invention. The actuator assembly 100 typically functions as a Voice Coil Motor (VCM) and includes a magnetic housing 102, covers 104, 106, an inner pole piece 108, an outer pole piece 109, an inner magnet structure 110, an outer magnet structure 112, and a coil 115 coupled to a positioning bracket 118. The housing 102 may be coupled to a coarse positioner 113. In a tape drive embodiment, a tape head 119 is coupled to a distal end of a positioning bracket 118. In such an embodiment, the actuator device 100 can act as a fine positioner which, together with the coarse positioner 113, operates to position the tape head 119 at various points along a path extending generally parallel to the axis of the inner pole piece 108.

The actuator assembly 100 is preferably cylindrical in shape. The coil 115 surrounds, but is not in contact with either pole piece 108, 109 and is operably connected to the read/write head 119 for track following purposes.

The inner and outer magnet structures 110, 112 may each be a single, continuous magnet or an effective annular magnet formed of an array of magnets, as will be described in more detail below. The inner magnet structure 110 lies between the coil 115 and the inner pole piece 108 and, in one embodiment, may preferably be attached to the outer surface of the inner pole piece 108. The outer magnet structure 112 lies between the coil 115 and the outer pole piece 109 and, in one embodiment, may preferably be attached to the inner surface of the outer pole piece 109.

As shown best in FIG. 2, the inner magnet structure 110 has an annular shape with multiple poles S, N that are radially oriented. The outer magnet structure 112 also has an annular shape with multiple poles N, S that are also radially oriented and magnetically opposite to the adjacent pole of the inner magnet structure 110. This configuration has the effect of forming a magnet ring, where the flux fields generated between the two magnet structures 110, 112 and in the pole pieces 108, 109 is compact. As shown by the arrows in FIG. 2, the upper portions of the magnets 110, 112 provide a flux field opposite to that provided by the bottom portion of the magnet ring, thus across the height of the assembly there are two fields that are radially oriented yet opposite to each other. As mentioned above, this configuration has the effect of keeping the flux primarily contained in the actuator volume. In existing actuators, the housing has to have a minimum thickness and be designed to ensure that no flux leaks out and affects critical areas of the host system. In the system according to the present invention, the flux path is more tightly controlled, so the designer has more flexibility to make portions of the housing thinner, which allows the designer to save space.

As alluded to above, the magnet structures 110, 112 may each be a single continuous annular-shaped magnet. While annular magnets are typically polarized top to bottom (axially), the magnets 110, 112 used herein are polarized radially.

Figure 3:
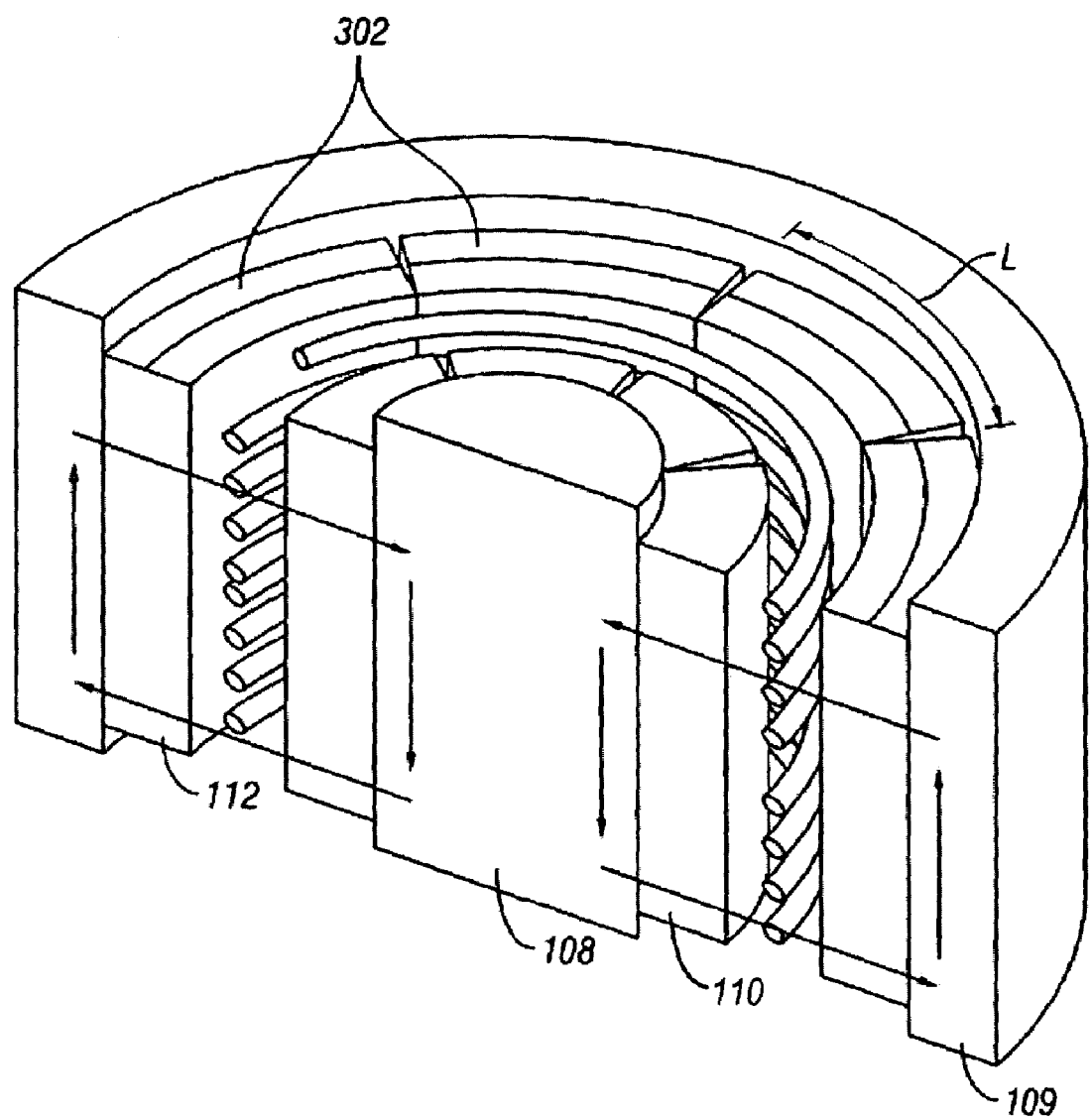
FIG. 3 is a partial sectional view of an actuator assembly where the magnet structures are formed of several sections.

One practicing the invention may find it easier to fabricate sectional magnets rather than a one-piece annular magnet. Accordingly, in an alternate embodiment, shown in FIG. 3, the actuator 100 can include sections 302 of magnets which together create an effective annular magnet. Again, the sections 302 are polarized to direct flux in a radial direction with respect to the inner pole piece 108. The inner magnet structure 110, the outer magnet structure 112, or both magnet strucures 110, 112 may be formed of multiple magnet sections 302. The angular length L of each section 302 is not critical, though the fewer number of sections 302, the greater will be the continuity of the magnetic flux field. Also, the arcuate profile of the sections 302 is preferred to most closely mimic the annular shape in the final magnet structure. An illustrative number of sections 302 range from 2 to 10 or more.

Magnet sections 302 having a rectangular cross section and arranged in an annular fashion are also suitable. In the rectangular section embodiment, a greater number of sections 302 may be preferred in order to provide a more circular shape. An illustrative number of rectangular sections 302 range from 3 to 20 or more. For example, 4 such sections will form a generally rectangular annulus, 5 sections will form a pentagonal annulus, and so on.

The magnets 110, 112 can be made of any suitable magnetic material.

The inner pole piece 108 is preferably a solid member having, but not limited to, a cylinder-shaped outer surface, and that is designed to allow the coil 115 and positioning bracket 118 coupled to it to move the read/write head 119 to all possible positions on the tape with the range of movement allowed by the actuator assembly 100. The inner pole piece 108 is preferably constructed of a material capable of channeling the flux emitted by the magnets 110, 112. Illustrative metals from which the inner pole piece 108 can be constructed include iron and iron alloys, preferably low carbon steels. One preferred material is magnetic stainless steel.

The outer pole piece 109 may also be a continuous member, or can be comprised of sections that couple together. Again, the housing 102 or portion thereof can act as the outer pole piece 109.

The housing 102 may function as the outer pole piece 109. In addition, the outer pole piece 109 may be an individual continuous part, it may be comprised of sections that couple together, or it may comprise a combination of the housing and additional parts. The outer pole piece 109 and/or housing 102 may be constructed of materials similar to or the same as the inner pole piece 108.

To utilize the flux fields for actuation, a single coil can be exposed to only one of the fields for driving the positioning bracket 118 and read/write head 119. In order to utilize both flux fields, a second independent coil can be placed adjacent to the first coil, thus having a single coil in each flux field. (Note that for this particular magnet configuration, if the coil were wound in only one direction for the full length of the magnets, the forces would fight each other and there would be no net movement.)

Figure 4:
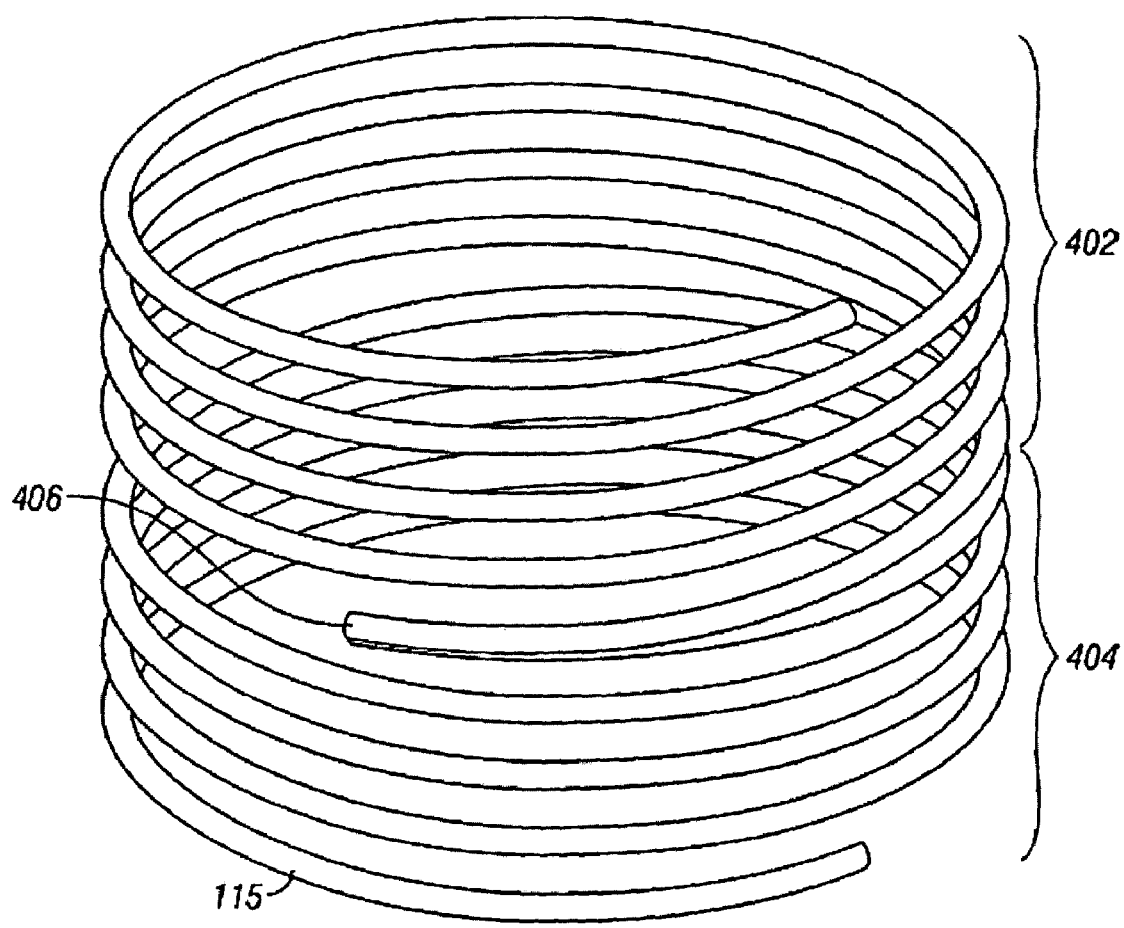
FIG. 4 is a representative perspective view of a dual wound monofilament coil according to one embodiment of the present invention.

Certain embodiments of the present invention implement a dual wound monofilament coil 115, as represented in FIG. 4. The dual wound monofilament coil configuration is able to utilize two opposing adjacent flux fields present within the actuator assembly; accordingly a cost reduction is achieved over the two-coil embodiment due to the fact that only one coil is needed and need be installed, as opposed to two independent coils. Further, the two-coil configuration would have four leads, while the dual wound monofilament coil has only two. Also, the dual wound monofilament coil configuration is more efficient than the single unidirectional coil as most if not all of the available field is utilized.

Note that the windings in the actual device will be much closer to each other, and the number of windings potentially greater, than those shown in FIG. 4.

With continued reference to FIG. 4, the coil has a first section 402 and a second section 404. The filament in the first section 402 is wound in a first direction, while the filament in the second section 404 is wound in a second direction different than the first direction. The single monofilament coil 115 can thus be treated as a two coils and will have the ability to generate a same directional force utilizing both polarities when a current is applied through the coil 115.

Preferably, one half of the winding is in the first direction and the other half is in the other direction. However, the length of filament in each section 402, 404 does not necessarily need to be equal.

Figure 5:
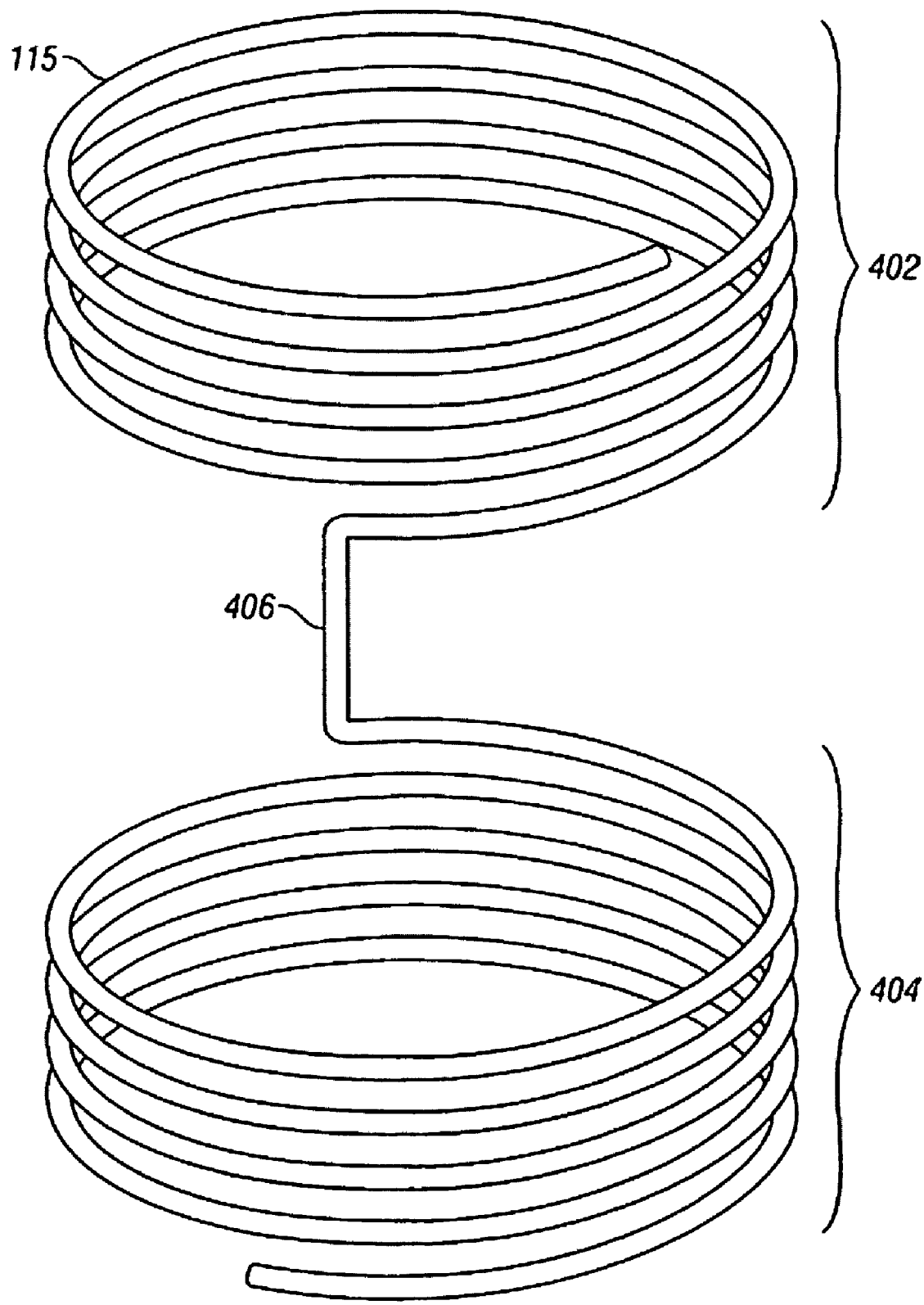
FIG. 5 is a representative perspective view of a dual wound monofilament coil according to one embodiment of the present invention.

Because of the proximity of windings in the transition area between the upper and lower magnets, as well as excursion of the actuator, a few turns of the coil 115 within each section 402, 404 may be exposed to the opposite field. Accordingly, a spacing at the reverse area 406 can be implemented to reduce opposing forces on the windings at the transition area, as shown in FIG. 5.

To make the dual wound monofilament coil 115, the filament may be initially wound on a mandrel in the first direction. Then, the filament is coupled to a stop, e.g., can be hooked over a pin, and the filament is wound on the mandrel in the opposite direction.

Referring again to FIG. 1, the positioner bracket 118 can be connected to the housing 102 in a pivoting manner so that fine movement is achieved at the distal end of the positioner bracket 118 as the coil 115 generates movement along the inner pole piece 108. A pivotal coupling can be accomplished through the use of a bearing 134. This connection could also be a spring or other constraining device to bias the fine position bracket towards a nominal center. However, as with any biasing, the head 119 would be susceptible to resonance. If the drive is exposed to vibrations, the resonance may be counteracted by continuously adjusting input to the coil 115.

By balancing the moments of mass around the fine positioner pivot bearing 134 (accounting for the head 119, cables, etc. coupled thereto), the actuator is more resistant to shock and vibration than a typical cantilever spring mass system. The moment can be eliminated for the positioner bracket 118 by designing the position of the coil 115, positioner bracket 118, and head 119 location such that in the event of external shock and vibration the fine positioner bracket 118 will not significantly tend to rotate around the pivot bearing 134. This can be accomplished by selecting a positioner bracket length 118 that equalizes the moments of mass around the fine positioner pivot bearing 134.

Preferred placement of the head 119 on the fine positioning bracket is aligned with the pivot bearing 134 so that the tension exerted on the head 119 by the tape does not create excessive torque. It would also be preferable to implement a head 119 such that the tape covers the whole length of the head 119 at any position thereacross. It should be noted that the head 119 can be offset from the pivot bearing 134. This may require the designer to increase the size of the actuator assembly 100 to compensate for the resulting torque.

In operation, the magnetic field generated by the inner pole piece 108, outer pole piece 109, magnets 110, 112, and optionally housing 102 and covers 104, 106 passes through the coil 115 in an orientation that causes a displacement when current is applied through the coil. The displacement of the coil 115 moves the positioning bracket 118. As an option, some type of damping mechanism may be added to the positioning bracket 118 to bias the positioning bracket 118, and thus the attached coil 115, at a nominal rest position. The damping mechanism provides benefits such as creating a counterforce that operates against the coil displacement, thereby smoothing the movement of the actuator, reducing displacement of the positioning bracket 118 in the event of transportation or impact, among other benefits. Illustrative damping mechanisms include leaf springs, coil springs, etc.

The actuator assembly 100 does not require any biasing, and can be essentially free floating. If no biasing is present, any force induced by the coil 115 will tend to make the positioner bracket 118 want to keep moving. Thus, the coil 115 can be continuously adjusted to keep the positioner bracket 118 in about the desired position (as in a disk drive actuator system). The same is true for incident biasing. For instance, if the actuator assembly 100 is oriented vertically, gravity may tend to bias one end of the positioner bracket 118 downwardly, so the coil 115 will counteract the effective biasing created by gravity. Similarly, the cables coupled to the head 119 and/or coil 115 may cause incident biasing, which is compensated for by the coil 115 by producing an opposite force, or by producing less force in the direction of incident biasing. The extent of the compensation can be determined by the controller, provided the controller receives some type of feedback, e.g., servo data, regarding the position of the positioner bracket 118. Note that the actuator device 100 can be increased in size to provide the force necessary to counteract gravity, biasing by cables, etc.

Figure 6:
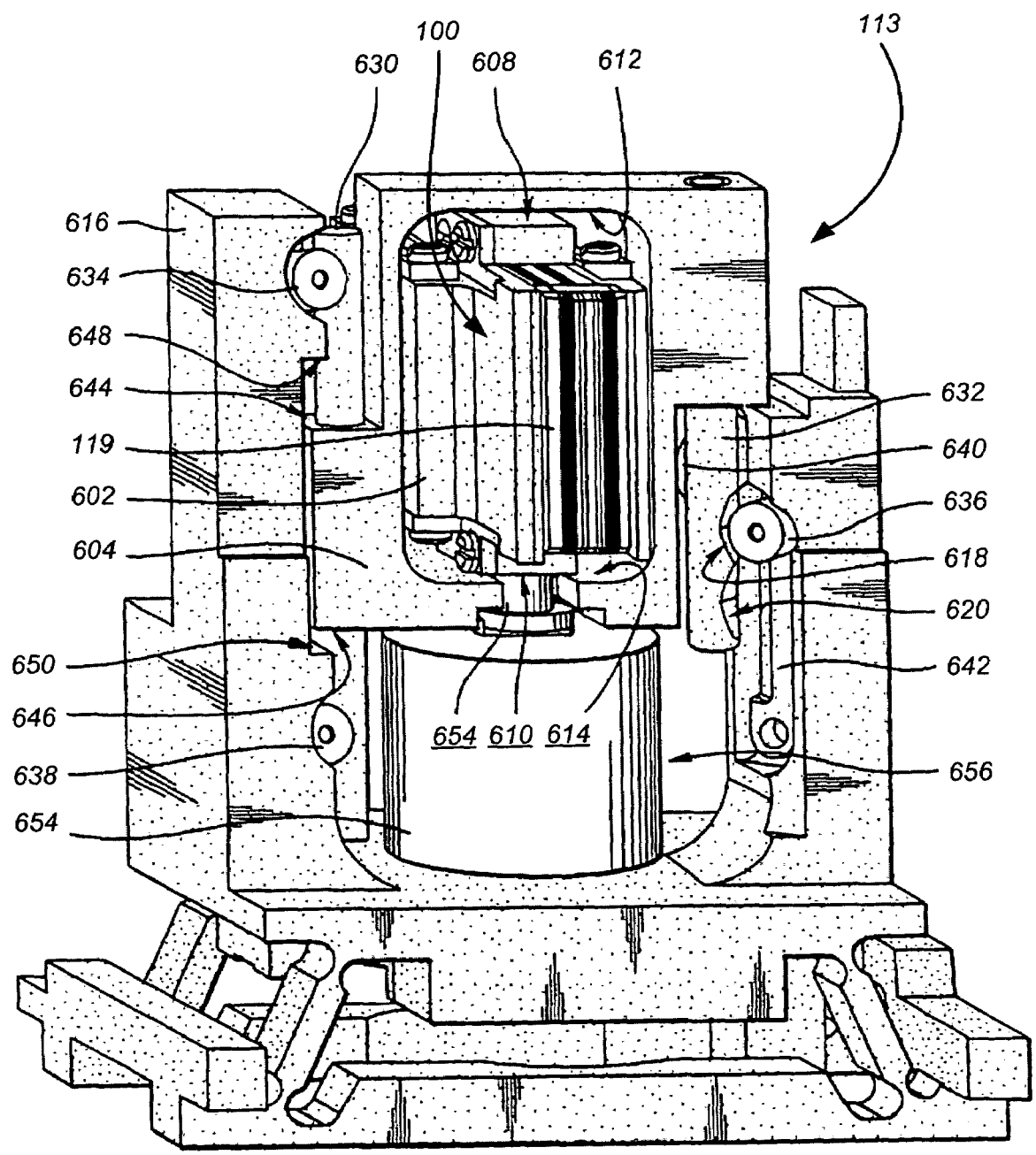
FIG. 6 is a perspective view of a coarse positioning actuator implemented in a tape drive system as seen from the tape medium side.

FIG. 6 is a perspective view of a coarse positioning actuator 113 implemented in a tape drive system as seen from the tape medium (not shown) side. Referring to FIG. 6, the transducer (tape head) 119 is mounted on the carriage 602, which includes a VCM actuator assembly 100 as described above. A resilient member (not shown) connects the carriage 602 to a moving frame 604. The resilient member can include flexures (not shown) made of thin metal strips that allow the carriage 602 to be displaced laterally (as defined by the tape medium) but not longitudinally with respect to the moving frame 604. Mechanical stops 608 and 610 are the top and bottom surfaces respectively of the carriage 602. Stop abutments 612 and 614 are inside surfaces of the moving carriage 604 opposite the mechanical stops 608 and 610 respectively.

The moving frame 604 slides relative to the fixed frame 616 on two rails 630 and 632 are guided by several guide bearings 634, 636, 638, 640. These guide bearings are rotatably mounted to the fixed frame 616. One of the bearings 636 is attached to the fixed frame 616 by a load arm 642 and acts as both a guide bearing and the click. Two detent notches 618 and 620 in rail 632 define two discrete positions for coarse positioning of the transducer 119.

Additional mechanical stops 644 and 646 and stop abutments 648 and 650 are defined on surfaces of the moving frame 604 and fixed frame 616 respectively. The mechanical stops 644-646 and the stop abutments 648-650 mechanically limit the range of motion of moving frame 604 with respect to the fixed frame 616. This keeps the rails 630 and 632 in contact with the guide bearings 634-640 and the guide/click bearing 636.

A motor 652 rotates a threaded shaft 654 of the actuator 656 that in turn causes movement of the carriage 602.

In use in a tape drive, the coarse positioning actuator 113 first moves the read/write head to the general vicinity on the tape and then the fine positioning actuator 100 is used for track following while the tape is in motion. Typically, once the target region on the tape has been reached under influence of the coarse actuator 113, the coil 115 is activated to precisely position the read/write head 119 over the desired location on the tape. During track following the current through the coil 115 is continuously adjusted to handle the excursion of the tracks on the tape as well as the lateral motion of the tape while the tape is moving. Control of the actuator device 100 and coarse actuator 113 is maintained by a controller implementing servo loop algorithms to control both actuators 100, 113 simultaneously, thereby keeping the head 119 aligned with the desired data tracks.

Figure 7:
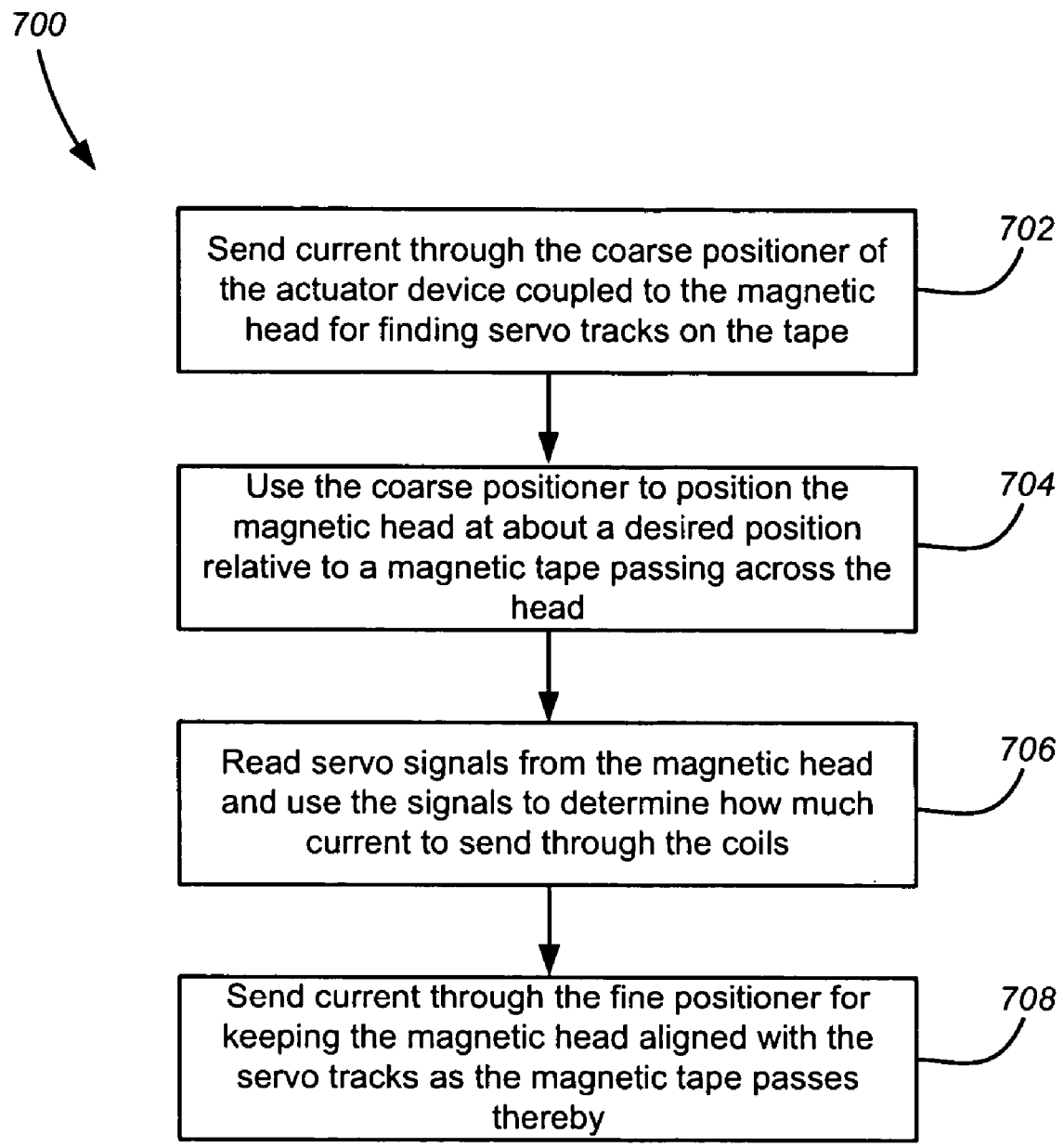
FIG. 7 illustrates a method for positioning a tape head relative to a tape.

FIG. 7 depicts one method 700 for positioning a magnetic tape head relative to a tape. In operation 702, a current is sent through a coarse positioning actuator coupled to the magnetic head for finding servo tracks on the tape. In operation 704, the coarse positioner is used to position the magnetic head at about a desired position relative to a magnetic tape passing across the head. In operation 706, servo signals are read from the magnetic head and used to determine how much current to send through the coils. In operation 708, a current is sent through the fine positioner for keeping the magnetic head aligned with the servo tracks as the magnetic tape passes thereby.

Figure 8:
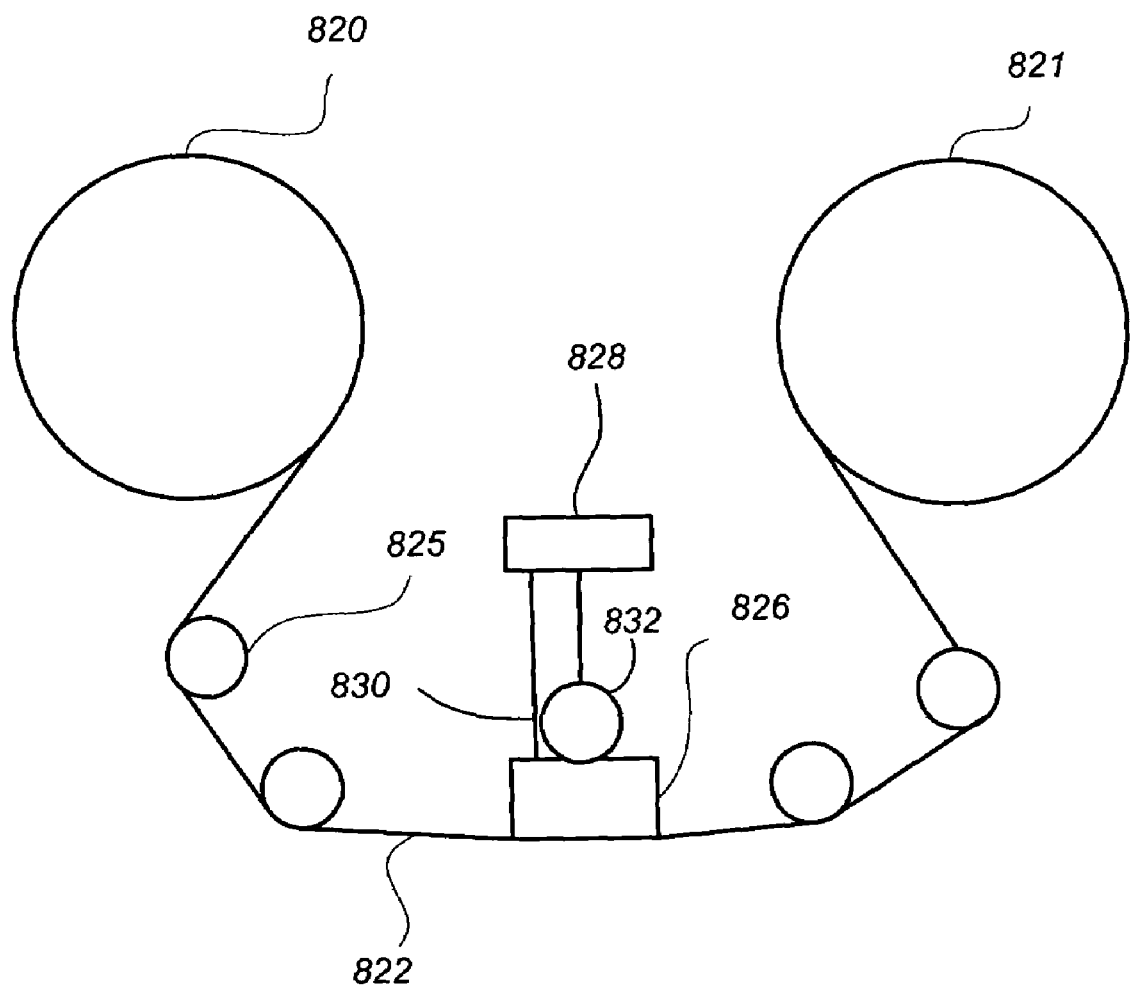
FIG. 8 is a schematic diagram of the tape drive system.

FIG. 8 illustrates a tape drive which may be employed in the context of the present invention. While one specific implementation of a tape drive is shown in FIG. 5, it should be noted that the embodiments of the previous figures may be implemented in the context of any type of drive (i.e. hard drive, tape drive, etc.).

As shown, a tape supply cartridge 820 and a take-up reel 821 are provided to support a tape 822. These may form part of a removable cassette and are not necessarily part of the system. Guides 825 guide the tape 822 across a preferably bidirectional tape head 826. Such tape head 826 is in turn coupled to a controller assembly 828 via an MR connector cable 830. The controller 828, in turn, controls head functions such as servo following, write bursts, read functions, etc. An actuator assembly 832, which includes a VCM assembly 200 as described above, controls position of the head 826 relative to the tape 822.

A tape drive, such as that illustrated in FIG. 8, includes drive motor(s) to drive the tape supply cartridge 820 and the take-up reel 821 to move the tape 822 linearly over the head 826. The tape drive also includes a read/write channel to transmit data to the head 826 to be recorded on the tape 822 and to receive data read by the head 826 from the tape 822. An interface is also provided for communication between the tape drive and a host (integral or external) to send and receive the data and for controlling the operation of the tape drive and communicating the status of the tape drive to the host, all as will be understood by those of skill in the art.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An actuator assembly, comprising:
   an inner annular magnet structure polarized radially;
   an outer annular magnet structure polarized radially;
   a coil positioned between the inner and outer magnet structures,
   wherein a flux field formed between upper portions of the magnet structures is oriented in an opposite direction as a flux field formed between lower portions of the magnet structures.

2. The actuator assembly as recited in claim 1, wherein at least one of the magnet structures is a single continuous magnet.

3. The actuator assembly as recited in claim 1, wherein at least one of the magnet structures is an assembly of multiple magnets.

4. The actuator assembly as recited in claim 3, wherein at least one of the magnet structures is an assembly of at least four magnets.

5. The actuator assembly as recited in claim 1, wherein the coil has a first section and a second section, a filament in the first section being wound in a first direction, a filament in the second section being wound in a second direction different than the first direction.

6. The actuator assembly as recited in claim 5, wherein the coil is a monofilament coil.

7. The actuator assembly as recited in claim 1, wherein the coil includes two coil structures.

8. The actuator assembly as recited in claim 1, further comprising an inner pole piece surrounded by an inner periphery of the inner magnet structure, and an outer pole piece surrounding the outer magnet structure.

9. A tape drive system, comprising:
   a head;
   a drive mechanism for passing a magnetic recording tape over the head;
   an actuator assembly as recited in claim 1 coupled to the head; and
   a controller in communication with the actuator.

10. An actuator assembly, comprising:
    an inner magnet structure polarized radially;
    an outer magnet structure polarized radially;
    a continuous monofilament coil positioned between the inner and outer magnet structures, the coil having a first section and a second section, the filament in the first section being wound in a first direction, the filament in the second section being wound in a second direction different than the first direction.

11. The actuator assembly as recited in claim 10, wherein the first and second sections of the coil are immediately adjacent.

12. The actuator assembly as recited in claim 10, wherein a gap is formed between the first and second sections of the coil.

13. The actuator assembly as recited in claim 10, wherein at least one of the magnet structures is a single continuous magnet.

14. The actuator assembly as recited in claim 10, wherein at least one of the magnet structures is an assembly of multiple magnets.

15. The actuator assembly as recited in claim 10, wherein a length of the filament in the first section is about the same as the length of the filament in the second section.

16. A tape drive system, comprising:
    a head;
    a drive mechanism for passing a magnetic recording tape over the head;
    an actuator assembly as recited in claim 10 coupled to the head; and
    a controller in communication with the actuator.

17. A tape drive actuator, comprising:
    a first positioner; and
    a second positioner coupled to the first positioner, the second positioner further comprising:
       an inner effective annular magnet polarized radially;
       an outer effective annular magnet polarized radially; and
       a continuous monofilament coil positioned between the inner and outer magnet structures, the coil having a first section and a second section, the filament in the first section being wound in a first direction, the filament in the second section being wound in a second direction different than the first direction.

18. A tape drive system, comprising:
    a head;
    a drive mechanism for passing a magnetic recording tape over the head;
    an actuator as recited in claim 17 coupled to the head; and
    a controller in communication with the actuator.

* * * * *